(12) United States Patent
Jin et al.

(10) Patent No.: US 9,160,247 B2
(45) Date of Patent: Oct. 13, 2015

(54) ALTERNATING CURRENT/DIRECT CURRENT ADAPTOR AND SELF-ADAPTIVE VOLTAGE OUTPUT METHOD

(75) Inventors: Xiaoyi Jin, Nanjing (CN); Yuli Feng, Nanjing (CN); Zhihong Ye, Nanjing (CN)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 235 days.

(21) Appl. No.: 13/476,065

(22) Filed: May 21, 2012

(65) Prior Publication Data

US 2013/0077349 A1 Mar. 28, 2013

(30) Foreign Application Priority Data

Sep. 26, 2011 (CN) .......................... 2011 1 0305765

(51) Int. Cl.
*H02M 5/42* (2006.01)
*H02M 7/04* (2006.01)
*H02M 7/68* (2006.01)
*H02M 1/00* (2007.01)
*H02J 1/00* (2006.01)

(52) U.S. Cl.
CPC ............ *H02M 7/04* (2013.01); *H02J 2001/008* (2013.01); *H02M 2001/007* (2013.01); *H02M 2001/0083* (2013.01)

(58) Field of Classification Search
CPC ......... H02M 7/00; H02M 7/04; H02M 7/003; H02M 7/043; H02M 7/12; H02M 7/1557; H02M 7/1626; H02M 1/08; H02M 1/10; H02M 3/04; H02M 3/10; H02M 3/145; H02M 3/155; H02M 3/156; H02M 3/157; H02M 2001/0006; H02M 2001/2009; H02M 7/02; H02M 7/06; H02M 2001/0067; H02M 2001/007; H02M 2001/0074; H02M 2001/0077; H02M 2001/0083; H01R 13/665; H01R 13/6675; G06F 1/26; G06F 1/32; G06F 1/3206; G06F 11/3062
USPC ................. 363/15–19, 34, 37, 40, 41, 44, 65, 363/67–71, 84, 88, 89, 95, 125–127, 131, 363/132, 146; 323/271–275, 282–285, 323/351–354; 320/137, 140, 143, 148, 149, 320/160–162, 164, 165; 307/116, 125, 126, 307/128, 130, 131, 140, 107, 112, 149, 307/151; 713/340, 300, 310
See application file for complete search history.

(56) References Cited

U.S. PATENT DOCUMENTS

| | | | | |
|---|---|---|---|---|
| 5,297,015 | A | * | 3/1994 | Miyazaki et al. ............. 363/146 |
| 6,181,576 | B1 | * | 1/2001 | Ikeda et al. ..................... 363/17 |
| 2004/0080891 | A1 | * | 4/2004 | Shyr et al. .................... 361/93.1 |
| 2007/0226524 | A1 | * | 9/2007 | Nakamura et al. ............ 713/300 |

* cited by examiner

*Primary Examiner* — Timothy J Dole
*Assistant Examiner* — Carlos Rivera-Perez
(74) *Attorney, Agent, or Firm* — Rosenberg, Klein & Lee

(57) ABSTRACT

An alternating current (AC)/direct current (DC) adaptor is to be coupled electrically with an electronic device having an electrical property, and includes a DC/DC converter that receives a DC voltage signal and a control signal, and that adjusts the DC voltage signal according to the control signal to obtain an output DC voltage signal. A device discriminator receives the output DC voltage signal, and generates, according to the output DC voltage signal and the electrical property, a device indication signal set. A controller obtains a target value according to the device indication signal set, and outputs the control signal according to an initial value or the target value to control voltage value of the output DC voltage signal provided to the electronic device.

9 Claims, 10 Drawing Sheets

ALTERNATING CURRENT/DIRECT CURRENT ADAPTOR AND SELF-ADAPTIVE VOLTAGE OUTPUT METHOD

CROSS-REFERENCE TO RELATED APPLICATION

This application claims priority of Chinese Application No. 201110305765.2, filed on Sep. 26, 2011.

BACKGROUND OF THE INVENTION

1. Field of the Invention

The present invention relates to an alternating current (AC)/direct current (DC) adaptor and a self-adaptive voltage output method.

2. Description of the Related Art

Referring to FIG. 1, a first conventional alternating current (AC)/direct current (DC) adaptor is adapted to provide two voltage signals with distinct levels to a respective one of a notebook computer (19V) and a mobile phone (5V). The AC/DC adaptor includes a first output connector 12 to be coupled electrically to the notebook computer, a second output connector 14 to be coupled electrically to the mobile phone, an AC/DC converter 10, a first DC/DC converter 11, and a second DC/DC converter 13.

The AC/DC converter 10 is coupled electrically with an AC power source (AC) which provides an AC voltage signal (110V) for receiving the AC voltage signal therefrom and for performing AC/DC conversion upon the AC voltage signal to obtain a DC voltage signal.

The first DC/DC converter 11 is coupled electrically to the AC/DC converter 10 for receiving the DC voltage signal therefrom, is coupled electrically to the first output connector 12, and adjusts a level of the DC voltage signal according to a fixed voltage buck rate so as to obtain a fixed first output voltage signal (19V). The first output voltage signal is provided to the notebook computer via the first output connector 12.

The second DC/DC converter 13 is coupled electrically to the first output connector 12 for receiving the first output voltage signal, is coupled electrically to the second output connector 14, and adjusts a level of the first output voltage signal according to a fixed voltage buck rate so as to obtain a fixed second output voltage signal (5V). The second output voltage signal is provided to the mobile phone via the second output connector 14.

However, the first conventional AC/DC adaptor has the following disadvantages:

1. Two of the first and second DC/DC converters 11 and 13, and two of the first and second output connectors 12 and 14 are required such that the cost is high.

2. The first and second output voltage signals are fixed in value such that there is some inconvenience during use.

Referring to FIG. 2, a second conventional AC/DC adaptor differs from the first conventional AC/DC adaptor in that the second AC/DC adaptor includes only one AC/DC converter 10, one DC/DC converter 11, and one output connector 12, and is adapted to convert an AC voltage signal (110V) into an output voltage signal (19V) to be provided to a notebook computer. When it is intended to provide electric power to an electronic device with a different requirement in voltage level, such as a mobile phone with the requirement of 5V, another DC/DC converter 13 is externally connected to the output connector 12 for converting the 19V output voltage signal into a 5V converted output voltage signal to be provided to the mobile phone. The second conventional AC/DC adaptor has similar disadvantages with respect to the first conventional AC/DC adaptor.

SUMMARY OF THE INVENTION

Therefore, in a first aspect of the pre sent invention, an alternating current (AC)/direct current (DC) adaptor for overcoming the aforementioned drawbacks is provided.

The AC/DC adaptor is to be coupled electrically with an AC power source which provides an AC voltage signal, and with an electronic device which has an electrical property. The AC/DC adaptor comprises an output connector, an AC/DC converter, a DC/DC converter, a device discriminator, and a controller.

The output connector is to be coupled electrically to the electronic device. The AC/DC converter is to be coupled electrically to the AC power source for receiving the AC voltage signal therefrom and for performing AC/DC conversion upon the AC voltage signal to obtain a DC voltage signal. The DC/DC converter is coupled electrically to the AC/DC converter for receiving the DC voltage signal therefrom, receives at least one control signal, and adjusts a level of the DC voltage signal according to the at least one control signal so as to obtain an output DC voltage signal. The device discriminator is coupled electrically to the DC/DC converter for receiving the output DC voltage signal therefrom, and is coupled electrically to the output connector. The device discriminator is configured to provide the output DC voltage signal to the output connector, and to generate, according to the output DC voltage signal and the electrical property of the electronic device coupled to the output connector, a device indication signal set associated with a device specification of the electronic device. The controller is coupled electrically to the DC/DC converter for providing the at least one control signal thereto. The controller is coupled electrically to the device discriminator for receiving the device indication signal set, and stores a discrimination table and an initial value of the at least one control signal. The discrimination table records a plurality of set values of the at least one control signal and a plurality of values of the device indication signal set. Each of the set values of the at least one control signal corresponds to one of the values of the device indication signal set and further corresponds to an electronic device with a specified device specification. Prior to receipt of the device indication signal set by the controller, the controller outputs the at least one control signal according to the initial value such that the DC/DC converter adjusts the DC voltage signal according to the initial value of the at least one control signal, so as to obtain the output DC voltage signal that has a predetermined output voltage value and that is provided to the output connector, and the device discriminator generates, according to the output DC voltage signal and the electrical property of the electronic device coupled to the output connector, the device indication signal set. Upon receipt of the device indication signal set by the controller, the controller looks up the discrimination table according to the device indication signal set so as to obtain the corresponding one of the set values of the at least one control signal as a target value, and outputs the at least one control signal according to the target value such that the DC/DC converter adjusts the DC voltage signal according to the target value, so as to obtain the output DC voltage signal which conforms with the device specification of the electronic device coupled to the output connector, and which is outputted to the output connector for transmission to the electronic device.

Preferably, the at least one control signal provided by the controller includes a level adjusting signal, and the DC/DC converter includes a high frequency inverter unit, a transformer unit, and a rectifier unit. The high frequency inverter unit is coupled electrically to the controller for receiving the level adjusting signal therefrom, and is coupled electrically to the AC/DC converter for receiving the DC voltage signal therefrom. The high frequency inverter unit performs, according to the level adjusting signal, DC/AC conversion and level adjustment upon the DC voltage signal to obtain a converted voltage signal. The transformer unit is coupled electrically to the high frequency inverter unit for receiving the converted voltage signal therefrom, and is configured to vary a level of the converted voltage signal according to a turns ratio so as to obtain an induction voltage signal. The rectifier unit is coupled electrically to the transformer unit for receiving the induction voltage signal therefrom, and is configured to perform rectification upon the induction voltage signal so as to obtain the output voltage signal. Prior to receipt of the device indication signal set by the controller, the controller sets the level adjusting signal according to the initial value for controlling the high frequency inverter unit to perform the DC/AC conversion and the level adjustment upon the DC voltage signal, so as to obtain the converted voltage signal that has a predetermined converted voltage value, the transformer unit varies the level of the converted voltage signal having the predetermined converted voltage value according to the turns ratio, so as to obtain the induction voltage signal that has a predetermined induction voltage value, and the rectifier unit performs the rectification upon the induction voltage signal having the predetermined induction voltage value, so as to obtain the output DC voltage signal having the predetermined output voltage value. Upon receipt of the device indication signal set by the controller, the controller sets the level adjusting signal according to the target value for controlling the high frequency inverter unit to perform the DC/AC conversion and the level adjustment upon the DC voltage signal, so as to obtain the converted voltage signal that has a target converted voltage value, the transformer unit varies the level of the converted voltage signal having the target converted voltage value according to the turns ratio, so as to obtain the induction voltage signal that has a target induction voltage value, and the rectifier unit performs the rectification upon the induction voltage signal having the target induction voltage value, so as to obtain the output DC voltage signal which conforms with the device specification of the electronic device coupled to the output connector.

Preferably, the electrical property of the electronic device is a device impedance. The device indication signal set includes a first signal and a second signal, and the device discriminator includes a switch, a diode, a resistor, a first comparator, and a second comparator. The switch has a first end coupled electrically to the DC/DC converter, a second end coupled electrically to the output connector, and a control end for receiving a switch signal. The switch is responsive to the switch signal to make or break electrical connection between the first end and the second end. The diode has an anode and a cathode coupled electrically to the second end of the switch. The resistor has a first end coupled electrically to the first end of the switch, and a second end coupled electrically to the anode of the diode. The first comparator has a non-inverting input coupled electrically to the second end of the resistor, an inverting input for receiving a first reference voltage, and an output for providing the first signal.

The second comparator has a non-inverting input coupled electrically to the second end of the resistor, an inverting input for receiving a second reference voltage, and an output for providing the second signal. When the controller outputs the at least one control signal according to the initial value, the controller correspondingly sets the switch signal for breaking the electrical connection between the first end and the second end of the switch, such that the output DC voltage signal having the predetermined output voltage value is divided, according to resistance of the resistor and the device impedance of the electronic device coupled to the output connector, to obtain a discrimination voltage signal, and the discrimination voltage signal is provided to the first and second comparators for comparison with the first and second reference voltages respectively so as to obtain the first and second signals. When the controller outputs the at least one control signal according to the target value, the controller correspondingly sets the switch signal, according to the target value, for making electrical connection between the first end and the second end of the switch for transmission of the output DC voltage signal, which conforms with the device specification of the electronic device coupled to the output connector, to the output connector.

Preferably, the at least one control signal provided by the controller includes a level adjusting signal, a first enabling signal and a second enabling signal, and the DC/DC converter includes a high frequency inverter unit, a transformer unit, a first rectifier unit, and a second rectifier unit. The high frequency inverter unit is coupled electrically to the controller for receiving the level adjusting signal therefrom, and is coupled electrically to the AC/DC converter for receiving the DC voltage signal therefrom. The high frequency inverter unit performs, according to the level adjusting signal, DC/AC conversion and level adjustment upon the DC voltage signal to obtain a converted voltage signal. The transformer unit is coupled electrically to the high frequency inverter unit for receiving the converted voltage signal therefrom, and is configured to vary a level of the converted voltage signal according to a turns ratio so as to obtain an induction voltage signal. The first rectifier unit is coupled electrically to the controller for receiving the first enabling signal therefrom, and is coupled electrically to the transformer unit for receiving the induction voltage signal therefrom. The first rectifier unit is controlled by the first enabling signal to rectify the induction voltage signal for obtaining the output DC voltage signal. The second rectifier unit is coupled electrically to the controller for receiving the second enabling signal therefrom, and is coupled electrically to the transformer unit for receiving the induction voltage signal therefrom. The second rectifier unit is controlled by the second enabling signal to rectify the induction voltage signal for obtaining the output DC voltage signal. Prior to receipt of the device indication signal set by the controller, the controller sets the level adjusting signal according to the initial value for controlling the high frequency inverter unit to perform the DC/AC conversion and the level adjustment upon the DC voltage signal, so as to obtain the converted voltage signal that has a predetermined converted voltage value, the transformer unit varies the level of the converted voltage signal having the predetermined converted voltage value according to the turns ratio, so as to obtain the induction voltage signal that has a predetermined induction voltage value, and the controller further sets starting values of the first and second enabling signals for enabling one of the first and second rectifier units and disabling the other of the first and second rectifier units, such that the enabled one of the first and second rectifier units rectifies the induction voltage signal having the predetermined induction voltage value, so as to obtain the output DC voltage signal having the predetermined output voltage value. Upon receipt of the device indication signal set by the controller, the controller sets the level adjusting signal according to the target value for controlling the high frequency inverter unit to perform the DC/AC conversion and the level adjustment upon the DC voltage signal, so as to obtain the converted voltage signal that has a target converted voltage value, the transformer unit varies the level of the converted voltage signal having the target converted voltage value according to the turns ratio, so as to obtain the induction voltage signal that has a target induction voltage value, and the controller further sets the first and second enabling signals according to the target value for enabling a corresponding one of the first and second rectifier units and disabling a non-corresponding one of the first and second rectifier units, such that the corresponding one of the first and second rectifier units rectifies the induction voltage signal having the target induction voltage value, so as to obtain the output DC voltage signal which conforms with the device specification of the electronic device coupled to the output connector.

Preferably, the at least one control signal provided by the controller includes two level adjusting signals, and the DC/DC converter includes two converter units each including a high frequency inverter unit, a transformer unit, and a rectifier unit. The high frequency inverter unit is coupled electrically to the controller for receiving a corresponding one of the level adjusting signals therefrom, and is coupled electrically to the AC/DC converter for receiving the DC voltage signal therefrom. The high frequency inverter unit is controlled by the corresponding one of the level adjusting signals to perform DC/AC conversion and level adjustment upon the DC voltage signal to obtain a converted voltage signal. The transformer unit is coupled electrically to the high frequency inverter unit. The rectifier unit is coupled electrically to the transformer unit. Prior to receipt of the device indication signal set by the controller, the controller sets the level adjusting signals according to the initial value for enabling one of the converter units and disabling the other of the converter units, the high frequency inverter unit of the enabled one of the converter units performs the DC/AC conversion and the level adjustment upon the DC voltage signal according to the initial value to obtain the converted voltage signal that has a predetermined converted voltage value, the transformer unit of the enabled one of the converter units varies the level of the converted voltage signal having the predetermined converted voltage value according to a turns ratio so as to obtain an induction voltage signal that has a predetermined induction voltage value, and the rectifier unit of the enabled one of the converter units rectifies the induction voltage signal having the predetermined induction voltage value so as to obtain the output DC voltage signal having the predetermined output voltage value. Upon receipt of the device indication signal set by the controller, the controller sets the level adjusting signals according to the target value for enabling a corresponding one of the converter units and disabling a non-corresponding one of the converter units, the high frequency inverter unit of the corresponding one of the converter units performs the DC/AC conversion and the level adjustment upon the DC voltage signal according to the target value to obtain the converted voltage signal that has a target converted voltage value, the transformer unit of the corresponding one of the converter units varies the level of the converted voltage signal having the target converted voltage value according to the turns ratio, so as to obtain the induction voltage signal that has a target induction voltage value, and the rectifier unit of the corresponding one of the converter units rectifies the induction voltage signal having the target induction voltage value, so as to obtain the output DC voltage signal which conforms with the device specification of the electronic device coupled to the output connector.

Preferably, the electronic device has a first device terminal and a second device terminal. The electrical property of the electronic device is a rated load. The device indication signal set includes a first signal and a second signal. The output connector has a first connector terminal and a second connector terminal to be coupled electrically and respectively to the first device terminal and the second device terminal of the electronic device. The device discriminator generates the device indication signal set based on an output current signal which flows from the first connector terminal, via the first device terminal and the second device terminal of the electronic device, to the second connector terminal and which corresponds to the predetermined output voltage value and the rated load of the electronic device. The device discriminator includes a resistor, a first comparator, and a second comparator. The resistor has a grounded first end, and a second end coupled electrically to the second connector terminal. A discrimination voltage signal is formed across the resistor according to magnitude of the output current signal and resistance of the resistor. The first comparator has a non-inverting input coupled electrically to the second connector terminal for receiving the discrimination voltage signal therefrom, an inverting input for receiving a first reference voltage, and an output for providing the first signal.

The second comparator has a non-inverting input coupled electrically to the second connector terminal for receiving the discrimination voltage signal therefrom, an inverting input for receiving a second reference voltage, and an output for providing the second signal. The second reference voltage is greater than the first reference voltage.

Preferably, the transformer unit includes a primary winding and a secondary winding. The turns ratio is a ratio of the number of turns in the primary and secondary windings of the transformer unit.

In a second aspect of the present invention, a self-adaptive voltage output method which overcomes the aforementioned drawbacks is provided.

The self-adaptive voltage output method is to be implemented by an AC/DC adaptor. The AC/DC adaptor is coupled electrically with an AC power source which provides an AC voltage signal, and with an electronic device which has an electrical property. The self-adaptive voltage output method comprises the steps of (A) converting the AC voltage signal into an output DC voltage signal that has a predetermined output voltage value, (B) outputting the output DC voltage signal that has the predetermined output voltage value to the electronic device, and generating, according to the output DC voltage signal and the electrical property of the electronic device, a device indication signal set associated with a device specification of the electronic device, (C) obtaining a target value corresponding to the device indication signal set by looking up a discrimination table stored in the AC/DC adaptor, the discrimination table recording a plurality of set values corresponding respectively to electronic devices with specified device specifications and a plurality of values of the device indication signal set corresponding respectively to the electronic devices with the specified device specifications, and (D) adjusting the voltage value of the output DC voltage signal outputted to the electronic device according to the target value.

Preferably, the AC/DC adaptor includes a controller, an AC/DC converter, a DC/DC converter, an output connector, and a device discriminator. The AC/DC converter is coupled electrically to the AC power source for performing AC/DC conversion to obtain a DC voltage signal. The DC/DC converter is coupled electrically to the AC/DC converter and is configured to adjust, under control of the controller, the DC voltage signal so as to obtain the output DC voltage signal. The output connector is coupled electrically to the electronic device to provide the output DC voltage signal thereto. The device discriminator outputs the device indication signal set to the controller. The device discriminator including a resistor which has two ends coupled respectively to the DC/DC converter and the output connector. The electrical property of the electronic device is a device impedance. The device indication signal set includes a first signal and a second signal, and in step (B), the output DC voltage signal having the predetermined output voltage value is divided, according to resistance of the resistor and the device impedance of the electronic device, through the device discriminator to obtain a discrimination voltage signal, and the discrimination voltage signal is compared with a first reference voltage and a second reference voltage respectively, so as to obtain the first and second signals.

Preferably, the AC/DC adaptor includes a controller, an AC/DC converter, a DC/DC converter, an output connector, and a device discriminator. The AC/DC converter is coupled electrically to the AC power source for performing AC/DC conversion to obtain a DC voltage signal. The DC/DC converter is coupled electrically to the AC/DC converter and is configured to adjust, under control of the controller, the DC voltage signal so as to obtain the output DC voltage signal. The output connector is coupled electrically to the electronic device to provide the output DC voltage signal thereto. The device discriminator outputs the device indication signal set to the controller. The device discriminator includes a resistor. The electrical property of the electronic device is a rated load. The device indication signal set includes a first signal and a second signal, and in step (B), the device discriminator generates the first and second signals by comparing a discrimination voltage signal with a first reference voltage and a second reference voltage, respectively. The discrimination voltage signal is formed across the resistor according to magnitude of an output current signal and resistance of the resistor. The output current signal flows from the output connector, through the electronic device, back to the output connector and through the resistor.

Preferably, in step (D), the voltage value of the output DC voltage signal is adjusted back to the predetermined output voltage value when the electronic device is disconnected from the AC/DC adaptor.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
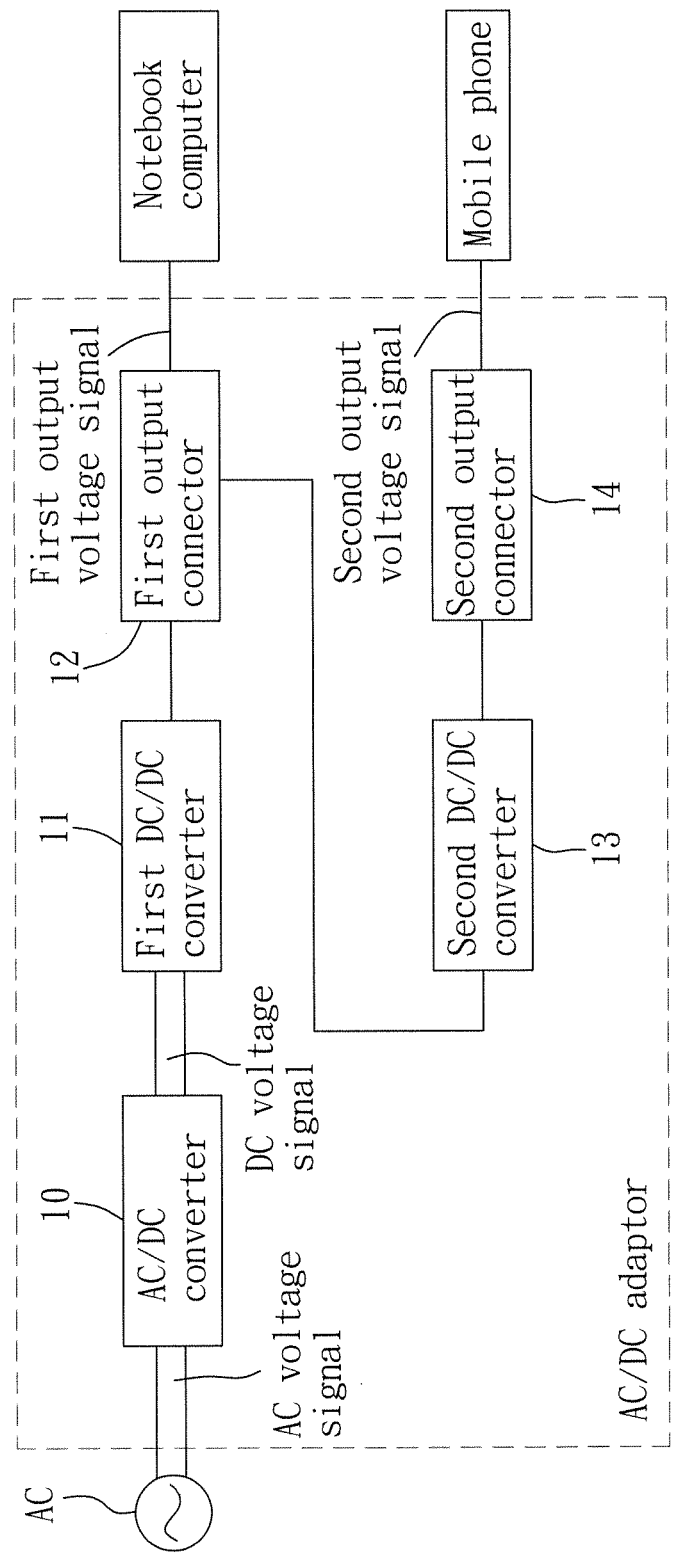
FIG. 1 is a circuit block diagram of a first conventional alternating current (AC)/direct current (DC) adaptor.
Figure 2:
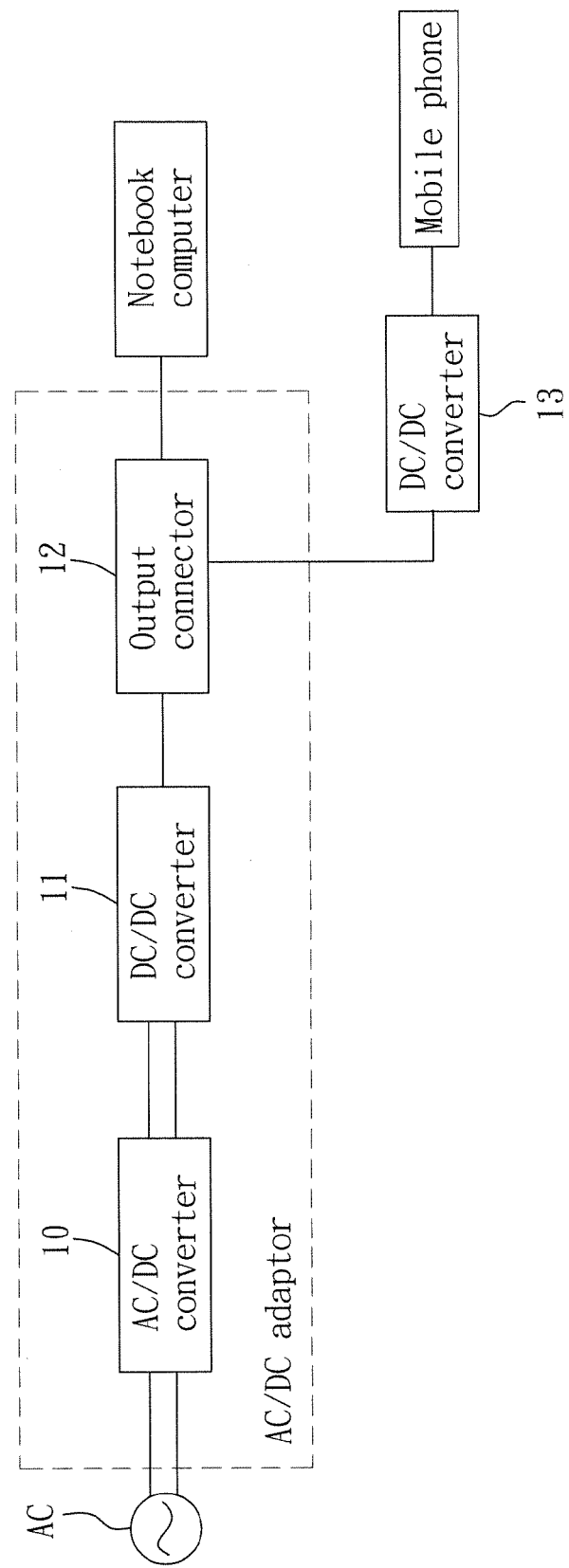
FIG. 2 is a circuit block diagram of a second conventional AC/DC adaptor.
Figure 3:
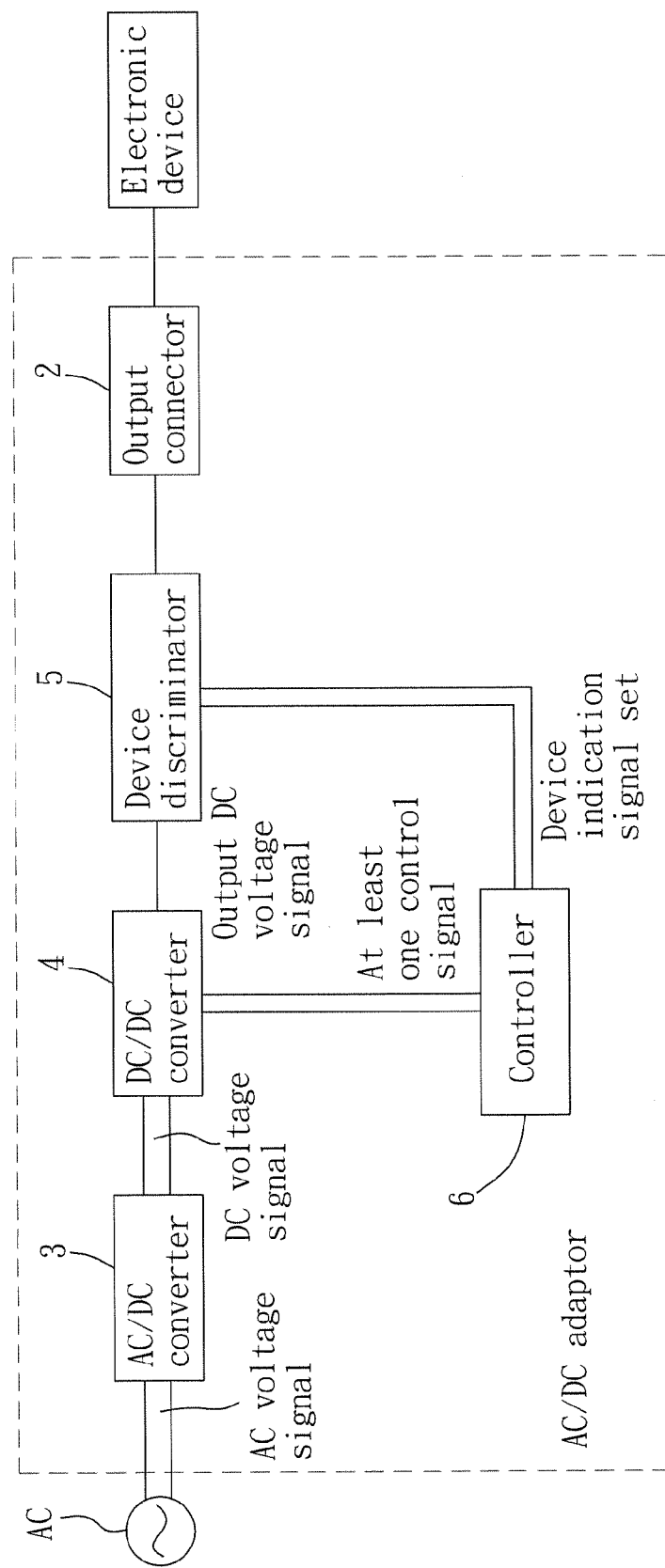
FIG. 3 is a circuit block diagram of a preferred embodiment of an AC/DC adaptor according to the present invention.

Referring to FIG. 3, a preferred embodiment of an alternating current (AC)/direct current (DC) adaptor according to the present invention is to be coupled electrically with an AC power source (AC) which provides an AC voltage signal, and with an electronic device which has an electrical property. The AC/DC adaptor comprises an output connector 2, an AC/DC converter 3, a DC/DC converter 4, a device discriminator 5, and a controller 6.

The output connector 2 is to be coupled electrically to the electronic device.

The AC/DC converter 3 is to be coupled electrically to the AC power source (AC) for receiving the AC voltage signal therefrom and for performing AC/DC conversion upon the AC voltage signal to obtain a DC voltage signal.

The DC/DC converter 4 is coupled electrically to the AC/DC converter 3 for receiving the DC voltage signal therefrom, is coupled electrically to the controller 6 for receiving at least one control signal therefrom, and adjusts a level of the DC voltage signal according to the at least one control signal so as to obtain an output DC voltage signal.

The device discriminator 5 is coupled between the DC/DC converter 4 and the output connector 2. Specifically, the device discriminator 5 is coupled electrically to the DC/DC converter 4 for receiving the output DC voltage signal therefrom, and is coupled electrically to the output connector 2. The device discriminator 5 is configured to provide the output DC voltage signal to the output connector 2, and to generate, according to the output DC voltage signal and the electrical property of the electronic device coupled to the output connector 2, a device indication signal set associated with a device specification of the electronic device.

The controller 6 is coupled electrically to the device discriminator 5 for receiving the device indication signal set, and stores a discrimination table and an initial value of the at least one control signal. The discrimination table records a plurality of set values of the at least one control signal and a plurality of values of the device indication signal set. Each of the set values of the at least one control signal corresponds to one of the values of the device indication signal set and further corresponds to an electronic device with a specified device specification. Furthermore, the controller 6 detects whether the electronic device is coupled to the output connector 2.

It is noted that the DC/DC converter 4 further provides electric power to the device discriminator 5 and the controller 6 for normal operation thereof. Therefore, once the AC power source is disconnected from the AC/DC adaptor, the AC/DC adaptor ceases to operate correspondingly. Since power supply of electronic components in an adaptor may be readily appreciated by those skilled in the art, further details of the same are omitted herein for the sake of brevity.

Figure 4:
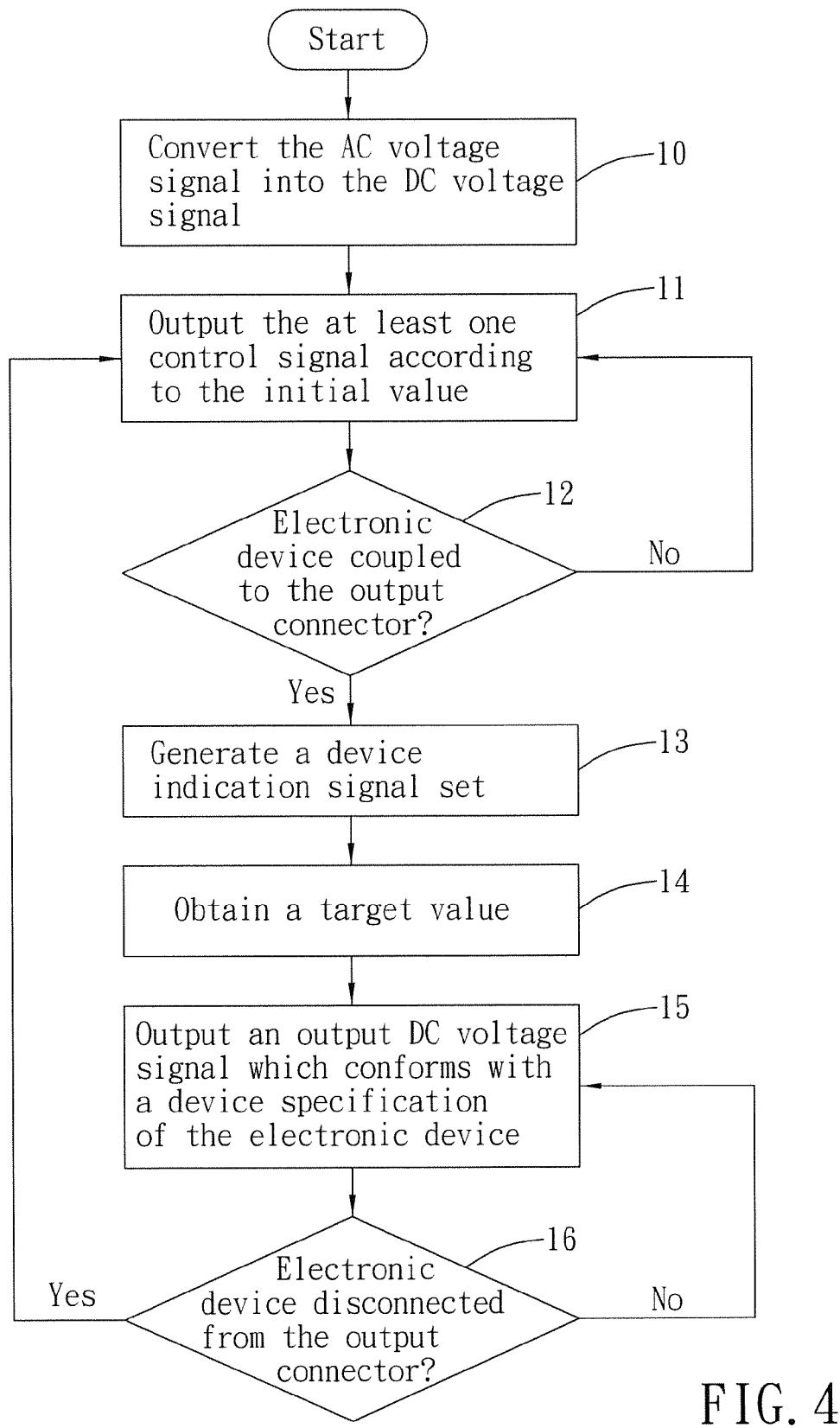
FIG. 4 is a flow chart of a self-adaptive voltage output method to be performed by the preferred embodiment.

Referring to FIG. 4, a self-adaptive voltage output method according to the present invention is illustrated hereinafter in combination with the aforementioned AC/DC adaptor.

In step 10, the AC/DC converter 3 converts the AC voltage signal into the DC voltage signal, and provides the DC voltage signal to the DC/DC converter 4.

In step 11, the controller 6 outputs the at least one control signal according to the initial value to the DC/DC converter 4 such that the DC/DC converter 4 adjusts the DC voltage signal according to the initial value of the at least one control signal so as to obtain the output DC voltage signal that has a predetermined output voltage value.

In step 12, the controller 6 detects whether the electronic device is coupled to the output connector 2. If affirmative, the flow proceeds to step 13 for discriminating the device specification of the electronic device. Otherwise, the flow goes back to step 11. In this embodiment, the controller 6 is capable of determining whether the AC/DC adaptor is coupled with a load according to a working status of the DC/DC converter 4. Since implementation for this determination is known in the art, further details of the same are omitted herein for the sake of brevity.

In step 13, the device discriminator 5 generates, according to the output DC voltage signal and the electrical property of the electronic device coupled to the output connector 2, a device indication signal set associated with the device specification of the electronic device, and outputs the device indication signal set to the controller 6.

In step 14, upon receipt of the device indication signal set by the controller 6, the controller 6 looks up the discrimination table according to the device indication signal set so as to obtain the corresponding one of the set values of the at least one control signal as a target value.

In step 15, the controller 6 outputs the at least one control signal according to the target value such that the DC/DC converter 4 adjusts the DC voltage signal according to the target value, so as to obtain the output DC voltage signal which conforms with the device specification of the electronic device coupled to the output connector 2, and which is outputted via the device discriminator 5 to the output connector 2 for transmission to the electronic device.

In step 16, the controller 6 determines whether the electronic device is disconnected from the output connector 2. If affirmative, the flow goes back to step 11, and the AC/DC adaptor is configured to wait for the next connection of the electronic device. Otherwise, the flow goes back to step 15, and the AC/DC adaptor keeps providing the output DC voltage signal to the electronic device.

<First Configuration>

Figure 5:
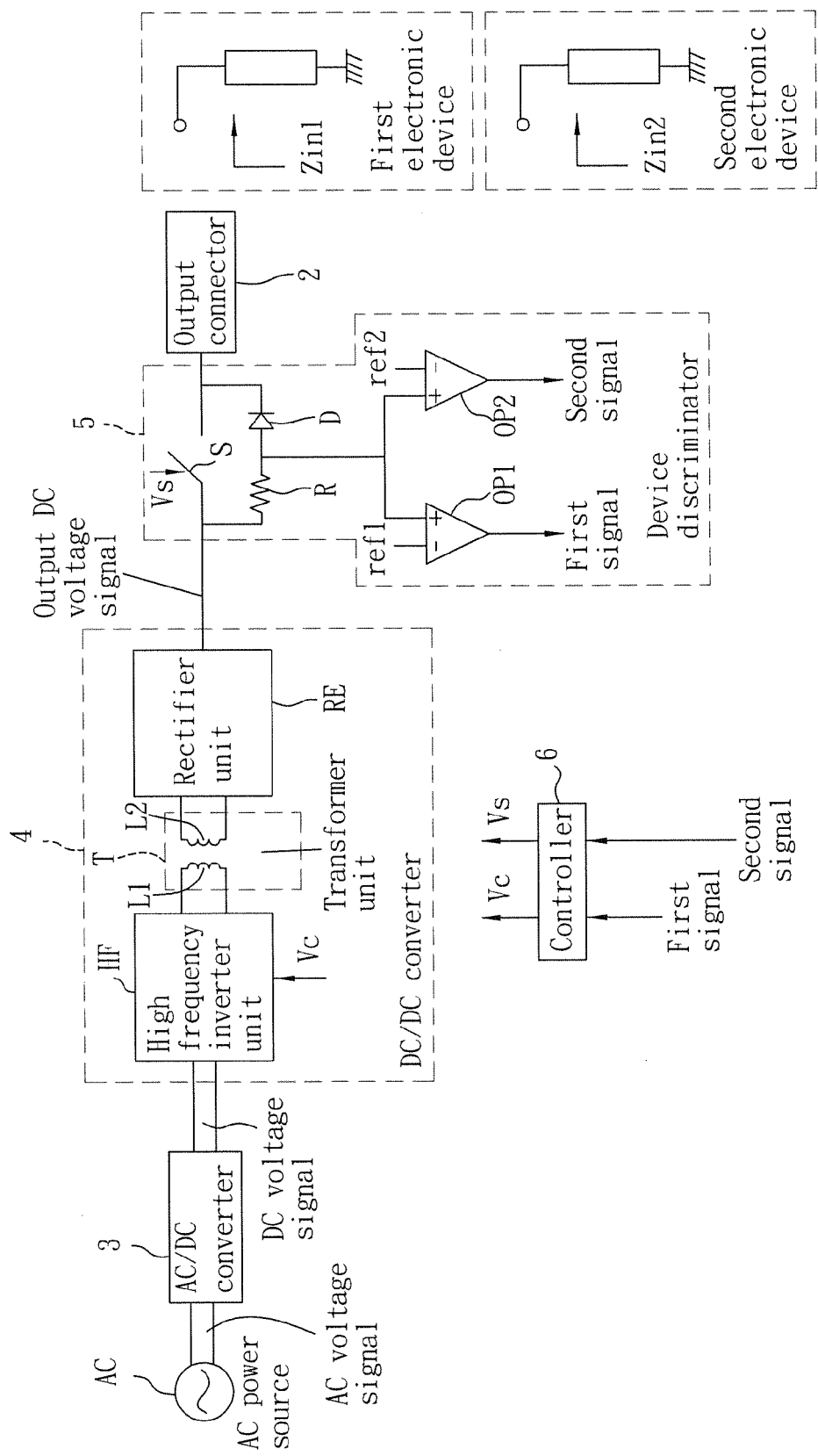
FIG. 5 is a circuit diagram of a first configuration of the preferred embodiment.

Referring to FIG. 5, a first configuration of the preferred embodiment is illustrated.

The electrical property of the electronic device is a device impedance. The electronic device may be one of a first electronic device having a first impedance (Zin1) (e.g., a notebook computer) and a second electronic device having a second impedance (Zin2) (e.g., a mobile phone).

The at least one control signal provided by the controller 6 includes a level adjusting signal (Vc), and the DC/DC converter 4 includes a high frequency inverter unit (HF), a transformer unit (T), and a rectifier unit (RE).

The high frequency inverter unit (HF) is coupled electrically to the controller 6 for receiving the level adjusting signal (Vc) therefrom, and is coupled electrically to the AC/DC converter 3 for receiving the DC voltage signal therefrom. The high frequency inverter unit (HV) performs, according to the level adjusting signal (Vc), DC/AC conversion and level adjustment upon the DC voltage signal to obtain a converted voltage signal.

The transformer unit (T) is coupled electrically to the high frequency inverter unit (HF) for receiving the converted voltage signal (Vc) therefrom, and is configured to vary a level of the converted voltage signal according to a turns ratio so as to obtain an induction voltage signal. The transformer unit (T) includes a primary winding (L1) and a secondary winding (L2). The turns ratio is a ratio of the number of turns in the primary and secondary windings (L1 and L2) of the transformer unit (T). The rectifier unit (RE) is coupled electrically to the transformer unit (T) for receiving the induction voltage signal therefrom, and is configured to perform rectification upon the induction voltage signal so as to obtain the output voltage signal.

The device indication signal set includes a first signal and a second signal, and the device discriminator 5 includes a switch (S), a diode (D), a resistor (R), a first comparator (OP1), and a second comparator (OP2).

The switch (S) has a first end coupled electrically to the DC/DC converter 4, a second end coupled electrically to the output connector 2, and a control end for receiving a switch signal (Vs). The switch (S) is responsive to the switch signal (Vs) to make or break electrical connection between the first end and the second end. The switch signal (Vs) is outputted from the controller 6. When the controller 6 outputs the at least one control signal according to the initial value, the controller 6 correspondingly sets the switch signal (Vs) for breaking the electrical connection between the first end and the second end of the switch (S). When the controller 6 outputs the at least one control signal according to the target value, the controller 6 correspondingly sets the switch signal (Vs), according to the target value, for making electrical connection between the first end and the second end of the switch (S) for transmission of the output DC voltage signal.

The diode (D) has an anode and a cathode coupled electrically to the second end of the switch (S).

The resistor (R) has a first end coupled electrically to the first end of the switch (S), and a second end coupled electrically to the anode of the diode (D).

The first comparator (OP1) has a non-inverting input (+) coupled electrically to the second end of the resistor (R), an inverting input (−) for receiving a first reference voltage (ref1), and an output for providing the first signal.

The second comparator (OP2) has a non-inverting input (+) coupled electrically to the second end of the resistor (R), an inverting input (−) for receiving a second reference voltage (ref2), and an output for providing the second signal.

Using this configuration, detailed operation of step 11 of the method illustrated in FIG. 4 is described hereinafter.

Prior to receipt of the device indication signal set by the controller 6, the controller 6 sets the level adjusting signal (Vc) according to the initial value for controlling the high frequency inverter unit (HF) to perform the DC/AC conversion and the level adjustment upon the DC voltage signal, so as to obtain the converted voltage signal that has a predetermined converted voltage value, the transformer unit (T) varies the level of the converted voltage signal having the predetermined converted voltage value according to the turns ratio, so as to obtain the induction voltage signal that has a predetermined induction voltage value, and the rectifier unit (RE) performs the rectification upon the induction voltage signal having the predetermined induction voltage value, so as to obtain the output DC voltage signal having the predetermined output voltage value. At this moment, the controller 6 sets the switch signal (Vs) for breaking the electrical connection between the first end and the second end of the switch (S).

When the electronic device is coupled with the AC/DC adaptor, the device discriminator 5 is configured to discriminate the device specification of the electronic device (i.e., step 13). Specifically, the output DC voltage signal having the predetermined output voltage value from the DC/DC converter 4 is divided, according to resistance of the resistor (R) and the device impedance of the electronic device coupled to the output connector 2, to obtain a discrimination voltage signal, and the discrimination voltage signal is provided to the first and second comparators (OP1 and OP2) for comparison with the first and second reference voltages (ref1 and ref 2) respectively so as to obtain the first and second signals. If the discrimination voltage signal is greater than the first reference voltage (ref1) and smaller than the second reference voltage (ref2), logic levels of the first signal and the second signal of the device indication signal set are at logic high 1 and logic low 0, respectively. Such levels indicate that the electronic device is the first electronic device. On the other hand, if the discrimination voltage signal is greater than the first and second reference voltages (ref1 and ref2), the logic levels of the first signal and the second signal of the device indication signal set are both at logic high 1. Such levels indicate that the electronic device is the second electronic device.

After obtaining the target value that corresponds to the electronic device coupled to the output connector 2 through looking up the discrimination table, step 15 of the method illustrated in FIG. 4 is performed. Detailed operation of step 15 is illustrated hereinafter.

The controller 6 sets the level adjusting signal (Vc) according to the target value for controlling the high frequency inverter unit (HF) to perform the DC/AC conversion and the level adjustment upon the DC voltage signal, so as to obtain the converted voltage signal that has a target converted voltage value, the transformer unit (T) varies the level of the converted voltage signal having the target converted voltage value according to the turns ratio, so as to obtain the induction voltage signal that has a target induction voltage value, and the rectifier unit (RE) performs the rectification upon the induction voltage signal having the target induction voltage value, so as to obtain the output DC voltage signal which conforms with the device specification of the electronic device coupled to the output connector 2.

Subsequently, the controller 6 correspondingly sets the switch signal (Vs), according to the target value, for making electrical connection between the first end and the second end of the switch (S) for transmission of the output DC voltage signal, which conforms with the device specification of the electronic device coupled to the output connector 2, to the output connector 2.

<Second Configuration>

Figure 6:
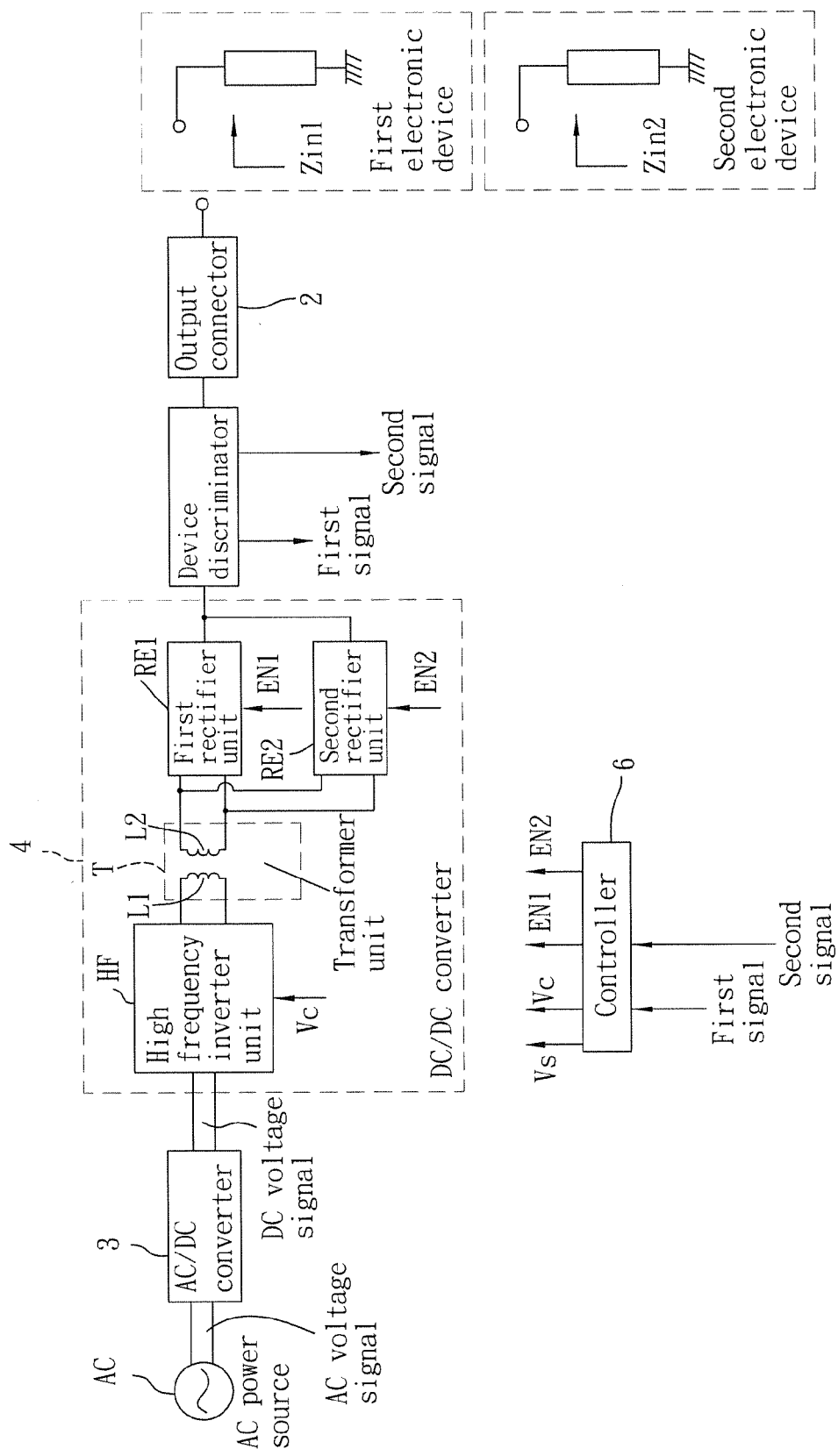
FIG. 6 is a circuit diagram of a second configuration of the preferred embodiment.

Referring to FIG. 6, a second configuration of the preferred embodiment differs from the first configuration in that:

The at least one control signal provided by the controller 6 includes a level adjusting signal (Vc), a first enabling signal (EN1) and a second enabling signal (EN2), and the DC/DC converter 4 includes a high frequency inverter unit (HF), a transformer unit (T), a first rectifier unit (RE1) used for high voltage rectification, and a second rectifier unit (RE2) used for low voltage rectification. In this configuration of the preferred embodiment, the first and second rectifier units (RE1 and RE2) correspond respectively to the first and second electronic devices.

The first rectifier unit (RE1) is coupled electrically to the controller 6 for receiving the first enabling signal (EN1) therefrom, and is coupled electrically to the transformer unit (T) for receiving the induction voltage signal therefrom. The first rectifier unit (RE1) is controlled by the first enabling signal (EN1) to rectify the induction voltage signal for obtaining the output DC voltage signal.

The second rectifier unit (RE2) is coupled electrically to the controller 6 for receiving the second enabling signal (EN2) therefrom, and is coupled electrically to the transformer unit (T) for receiving the induction voltage signal therefrom. The second rectifier unit (RE2) is controlled by the second enabling signal (EN2) to rectify the induction voltage signal for obtaining the output DC voltage signal.

In the second configuration, the detailed operation of step 11 of the method illustrated in FIG. 4 differs from that in the first configuration as follows.

Prior to receipt of the device indication signal set by the controller 6, the controller 6 sets the level adjusting signal (Vc) according to the initial value for controlling the high frequency inverter unit (HF) to perform the DC/AC conversion and the level adjustment upon the DC voltage signal, so as to obtain the converted voltage signal that has a predetermined converted voltage value, the transformer unit (T) varies the level of the converted voltage signal having the predetermined converted voltage value according to the turns ratio, so as to obtain the induction voltage signal that has a predetermined induction voltage value, and the controller 6 further sets starting values of the first and second enabling signals (EN1 and EN2) for enabling one of the first and second rectifier units (RE1 or RE2) and disabling the other of the first and second rectifier units (RE2 or RE1), such that the enabled one of the first and second rectifier units (RE1 or RE2) rectifies the induction voltage signal having the predetermined induction voltage value, so as to obtain the output DC voltage signal having the predetermined output voltage value. In this configuration, the first and second enabling signals (EN1 and EN2) are switched between logic high and logic low, respectively. When one of the first and second enabling signals (EN1 or EN2) is at logic high, a corresponding one of the first and second rectifier units (RE1 or RE2) is enabled. When one of the first and second enabling signals (EN1 or EN2) is at logic low, a corresponding one of the first and second rectifier units (RE1 or RE2) is disabled. However, the enablement setup is not limited to the disclosure herein.

Using the second configuration, the detailed operation of step 15 of the method illustrated in FIG. 4 differs from that in the first configuration as follows.

The controller 6 further sets the first and second enabling signals (EN1 and EN2) according to the target value for enabling a corresponding one of the first and second rectifier units (RE1 or RE2) and disabling a non-corresponding one of the first and second rectifier units (RE2 or RE1), such that the corresponding one of the first and second rectifier units (RE1 or RE2) rectifies the induct ion voltage signal having the target induction voltage value so as to obtain the output DC voltage signal which conforms with the device specification of the electronic device coupled to the output connector 2. Specifically, when the electronic device coupled to the output connector 2 is the first electronic device, the first and second enabling signals (EN1 and EN2) are set respectively as logic high 1 and logic low 0. On the other hand, when the electronic device coupled to the output connector 2 is the second electronic device, the first and second enabling signals (EN1 and EN2) are set respectively as logic low 0 and logic high 1.

<Third Configuration>

Figure 7:
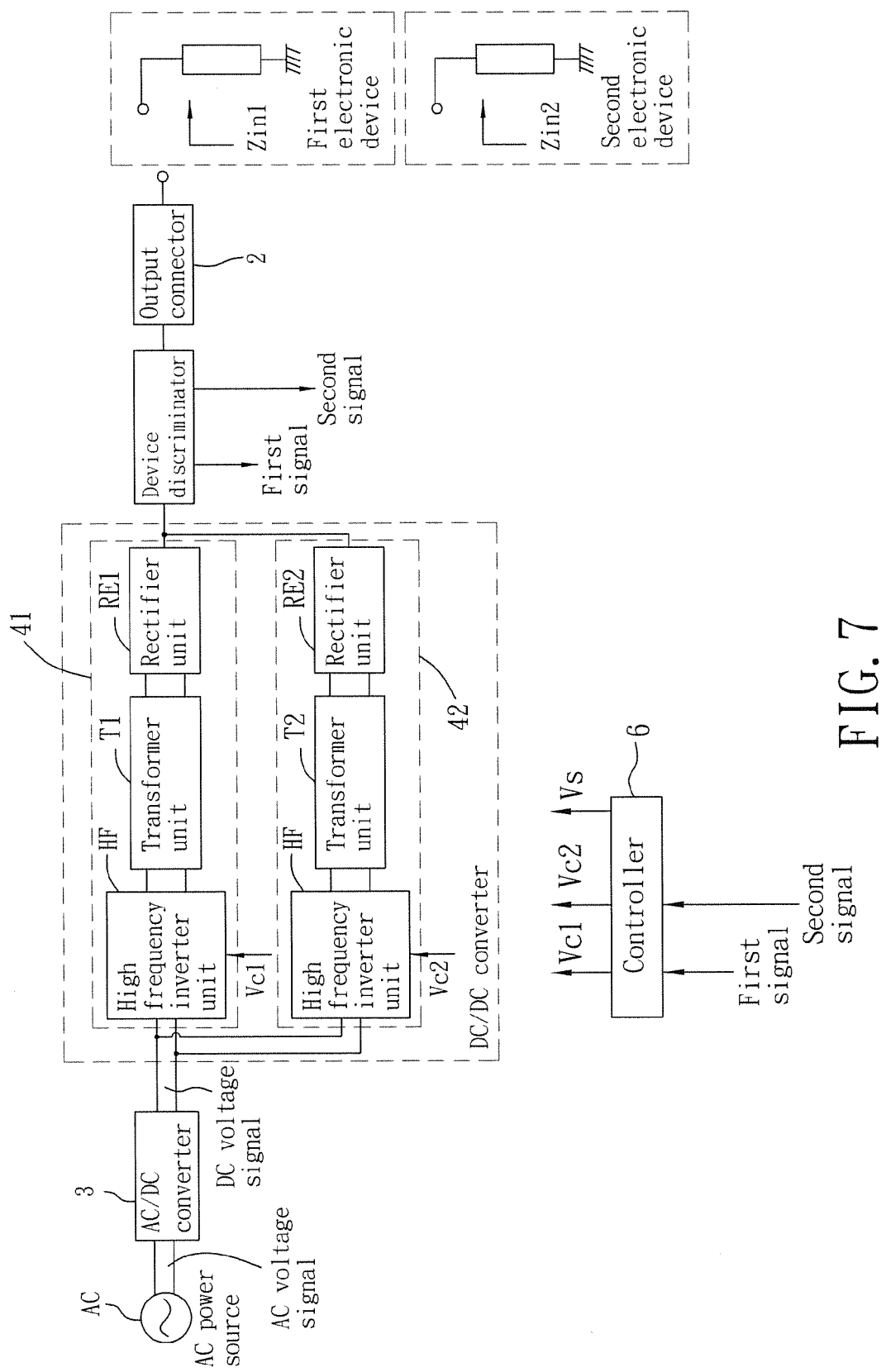
FIG. 7 is a circuit diagram of a third configuration of the preferred embodiment.

Referring to FIG. 7, a third configuration of the preferred embodiment differs from the first configuration in that:

The at least one control signal provided by the controller 6 includes two level adjusting signals (Vc1 and Vc2) corresponding respectively to high voltage conversion and low voltage conversion, and the DC/DC converter 4 includes two converter units 41 and 42. The two converter units 41 and 42 are used for the high voltage conversion and the low voltage conversion respectively, and each includes a high frequency inverter unit (HF1 or HF2), a transformer unit (T1 or T2), and a rectifier unit (RE1 or RE2). The high frequency inverter unit (HF1 or HF2) is coupled electrically to the controller 6 for receiving a corresponding one of the level adjusting signals (Vc1 or Vc2) therefrom, and is coupled electrically to the AC/DC converter 3 for receiving the DC voltage signal therefrom. The high frequency inverter unit (HF1 or HF2) is controlled by the corresponding one of the level adjusting signals (Vc1 or Vc2) to perform DC/AC conversion and level adjustment upon the DC voltage signal to obtain a converted voltage signal. The transformer unit (T1 or T2) is coupled electrically to the high frequency inverter unit (T1 or T2), and the rectifier unit (RE1 or RE2) is coupled electrically to the transformer unit (T1 or T2).

In the third configuration, the detailed operation of step 11 of the method illustrated in FIG. 4 differs from that in the first configuration as follows.

Prior to receipt of the device indication signal set by the controller 6, the controller 6 sets the level adjusting signals (Vc1 and Vc2) according to the initial value for enabling one of the converter units 41 or 42 and disabling the other of the converter units 42 or 41, the high frequency inverter unit (HF1 or HF2) of the enabled one of the converter units 41 or 42 performs the DC/AC conversion and the level adjustment upon the DC voltage signal according to the initial value to obtain the converted voltage signal that has a predetermined converted voltage value, the transformer unit (T1 or T2) of the enabled one of the converter units 41 or 42 varies the level of the converted voltage signal having the predetermined converted voltage value according to a turns ratio, so as to obtain an induction voltage signal that has a predetermined induction voltage value, and the rectifier unit (RE1 or RE2) of the enabled one of the converter units 41 or 42 rectifies the induction voltage signal having the predetermined induction voltage value, so as to obtain the output DC voltage signal having the predetermined output voltage value.

Using the third configuration, the detailed operation of step 15 of the method illustrated in FIG. 4 differs from that in the first configuration as follows. The controller 6 sets the level adjusting signals (Vc1 and Vc2) according to the target value for enabling a corresponding one of the converter units 41 or 42 and disabling a non-corresponding one of the converter units 42 or 41, the high frequency inverter unit (HF1 or HF2) of the corresponding one of the converter units 41 or 42 performs the DC/AC conversion and the level adjustment upon the DC voltage signal according to the target value to obtain the converted voltage signal that has a target converted voltage value, the transformer unit (T1 or T2) of the corresponding one of the converter units 41 or 42 varies the level of the converted voltage signal having the target converted voltage value according to the turns ratio, so as to obtain the induction voltage signal that has a target induction voltage value, and the rectifier unit (RE1 or RE2) of the corresponding one of the converter units 41 or 42 rectifies the induction voltage signal having the target induction voltage value, so as to obtain the output DC voltage signal which conforms with the device specification of the electronic device coupled to the output connector 2. Specifically, when the electronic device coupled to the output connector 2 is the first electronic device, a pulse width of the level adjusting signal (Vc1) is associated with the target value for enabling the high frequency inverter unit (HF1), and a pulse width of the level adjusting signal (Vc2) is zero for disabling the high frequency inverter unit (HF2). On the other hand, when the electronic device coupled to the output connector 2 is the second electronic device, a pulse width of the level adjusting signal (Vc2) is associated with the target value for enabling the high frequency inverter unit (HF2), and a pulse width of the level adjusting signal (Vc1) is zero for disabling the high frequency inverter unit (HF1). Since circuit operation of the third configuration is similar to the second configuration of the preferred embodiment, further details will not be restated herein.

<Fourth Configuration>

Figure 8:
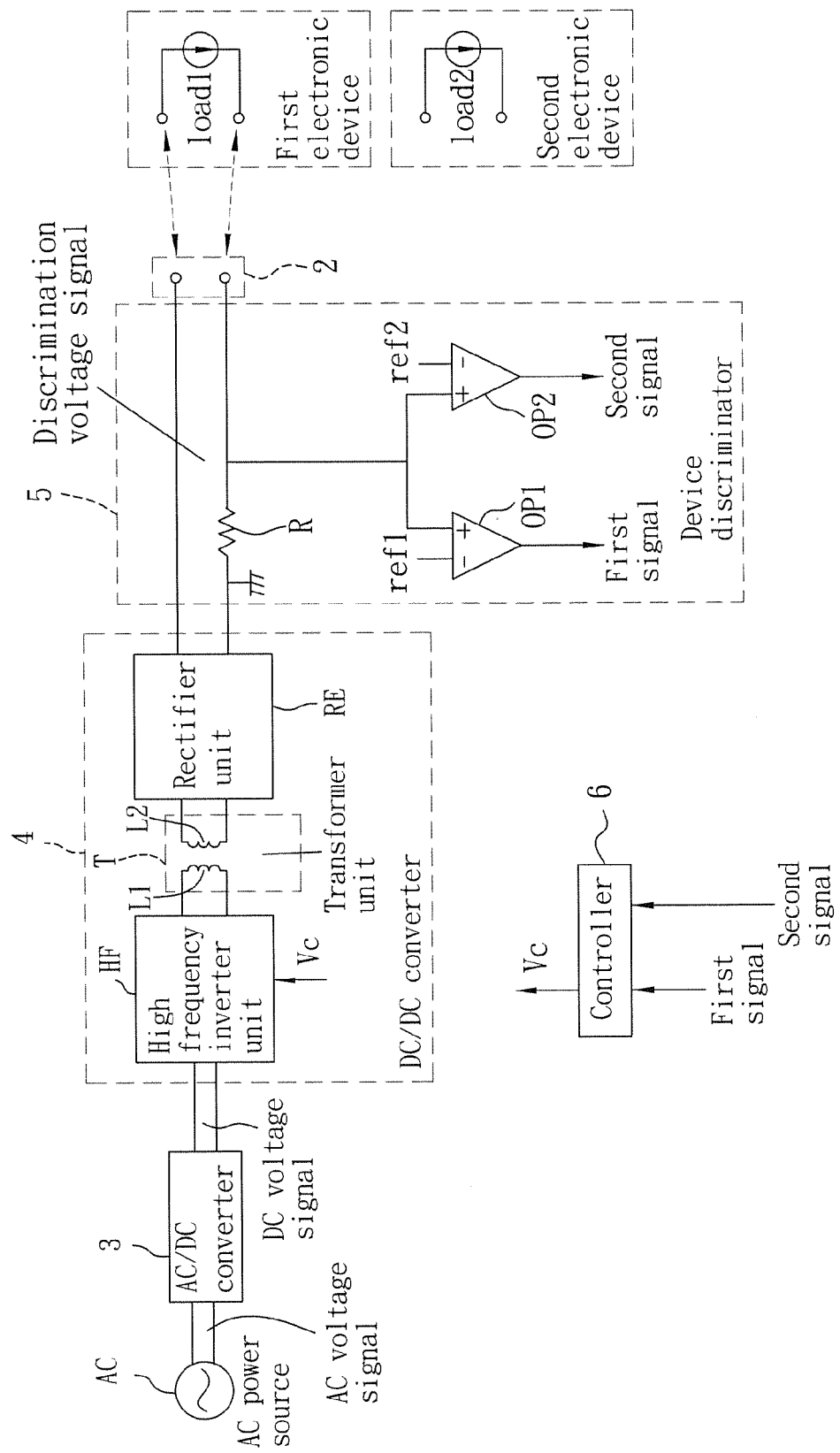
FIG. 8 is a circuit diagram of a fourth configuration of the preferred embodiment.

Referring to FIG. 8, a fourth configuration of the preferred embodiment differs from the first configuration in that:

The electrical property of the electronic device is a rated load. The electronic device has a first device terminal and a second device terminal, and may be one of a first electronic device which has a first rated load (load1) formed between the first and second device terminals (e.g., a notebook computer) and a second electronic device which has a second rated load (load2) formed between the first and second device terminals (e.g., a mobile phone).

The output connector 2 has a first connector terminal and a second connector terminal to be coupled electrically and respectively to the first device terminal and the second device terminal of the electronic device.

The device discriminator 5 is coupled electrically between the DC/DC converter 4 and the output connector 2, and generates the device indication signal set based on an output current signal which flows from the first connector terminal, via the first device terminal and the second device terminal of the electronic device, to the second connector terminal and which corresponds to the predetermined output voltage value of the output DC voltage signal and the rated load of the electronic device. The device discriminator 5 includes a resistor (R), a first comparator (OP1), and a second comparator (OP2).

The resistor (R) has a grounded first end, and a second end coupled electrically to the second connector terminal. A discrimination voltage signal is formed across the resistor (R) according to magnitude of the output current signal and resistance of the resistor (R).

The first comparator (OP1) has a non-inverting input (+) coupled electrically to the second connector terminal for receiving the discrimination voltage signal therefrom, an inverting input (−) for receiving a first reference voltage (ref1), and an output for providing the first signal.

The second comparator (OP2) has a non-inverting input (+) coupled electrically to the second connector terminal for receiving the discrimination voltage signal therefrom, an inverting input (−) for receiving a second reference voltage (ref2), and an output for providing the second signal. In this configuration, the second reference voltage (ref2) is greater than the first reference voltage (ref1). If the discrimination voltage signal is greater than the first reference voltage (ref1) and smaller than the second reference voltage (ref2), logic levels of the first signal and the second signal of the device indication signal set are at logic high 1 and logic low 0, respectively. Such levels indicate that the electronic device is the first electronic device. On the other hand, if the discrimination voltage signal is greater than the first and second reference voltages (ref1 and ref2), the logic levels of the first signal and the second signal of the device indication signal set are both at logic high 1. Such levels indicate that the electronic device is the second electronic device.

<Fifth Configuration>

Figure 9:
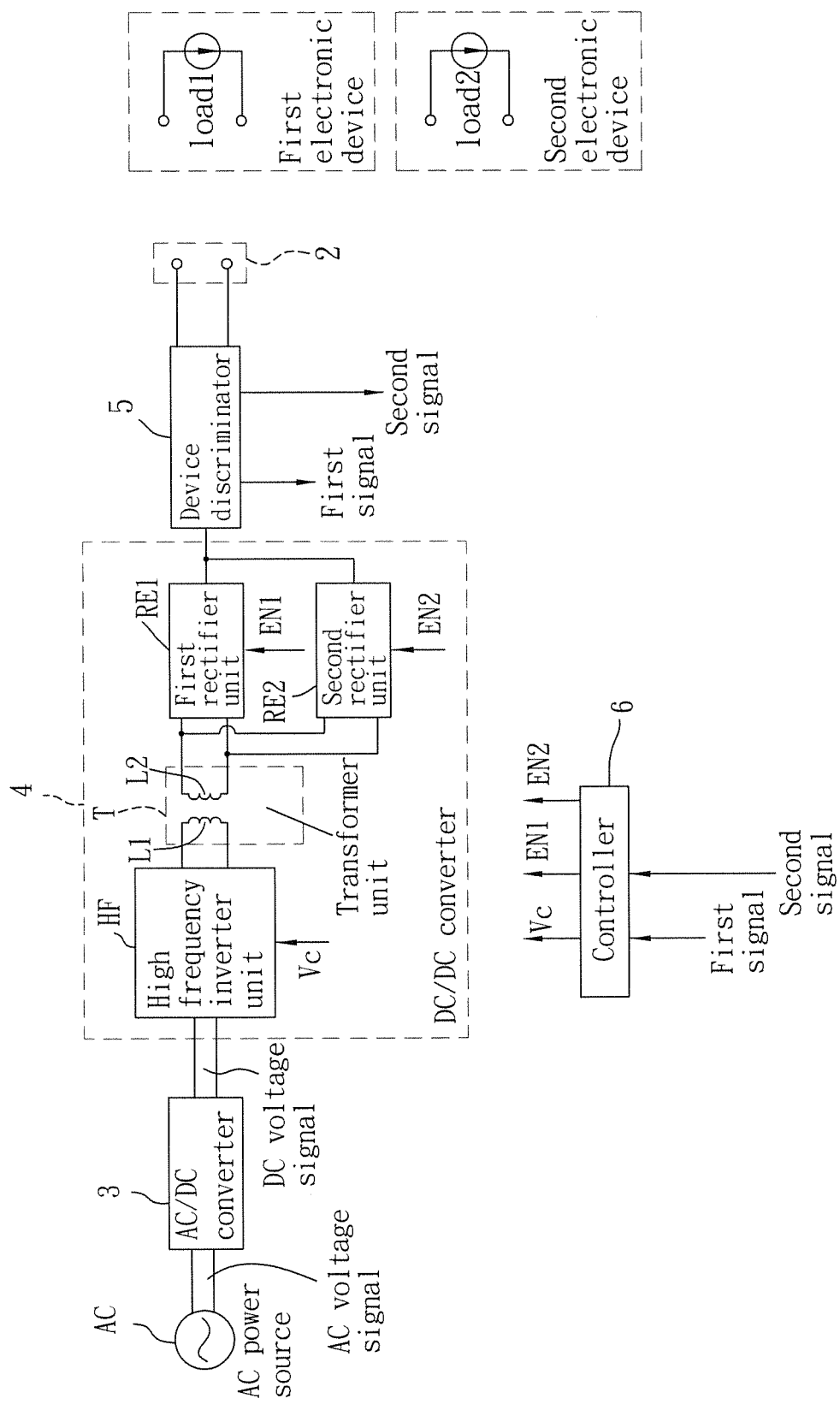
FIG. 9 is a circuit diagram of a fifth configuration of the preferred embodiment.

Referring to FIG. 9, a fifth configuration of the preferred embodiment differs from the fourth configuration in that:

Detailed architecture of the DC/DC converter 4 is similar to that in the second configuration, which is already illustrated hereinabove.

<Sixth Configuration>

Figure 10:
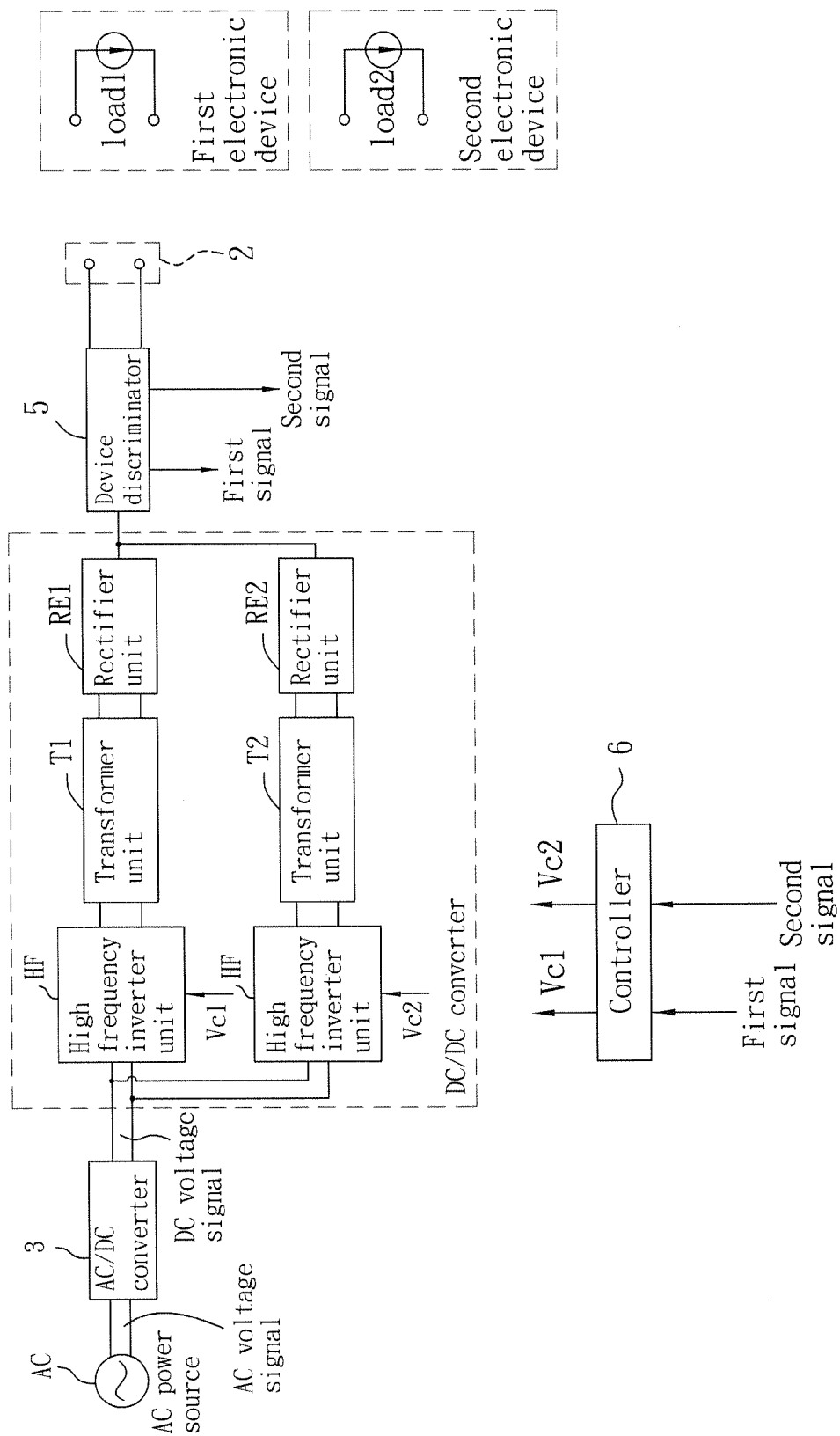
FIG. 10 is a circuit diagram of a sixth configuration of the preferred embodiment.

Referring to FIG. 10, a sixth configuration of the preferred embodiment differs from the fourth configuration in that:

The detailed architecture of the DC/DC converter 4 is similar to that in the third configuration, which is already illustrated hereinabove.

The preferred embodiment of the present invention is described as having the capability of providing electric power to two electronic devices with different device specifications. However, those skilled in the art would appreciate that when it is desired to expand the number of device specifications of electronic devices which may be supported by the AC/DC adaptor, only the design of the device discriminator 5 needs modification, such as adding comparators and expanding the discrimination table. Moreover, as the AC/DC adaptor is desired to support other electronic devices with different device specifications, the manufacturer only needs to update the discrimination table for lowering inventory and manufacturing cost.

Furthermore, the aforementioned preferred embodiment, by virtue of adopting the device discriminator 5 and the controller 6, is able to make the output DC voltage signal automatically track change of the connected electronic device, such that a user may use the single AC/DC adaptor in combination with many kinds of electronic devices. Besides, the user is freed from the inconvenience of determining the suitable output connector as a result of the unified design of the output connector of the AC/DC converter.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An alternating current (AC)/direct current (DC) adaptor to be coupled electrically with an AC power source which provides an AC voltage signal, and with an electronic device which has an electrical power interconnection property, the electronic device having a first device terminal and a second device terminal, the electrical power interconnection property of the electronic device being a rated load, said AC/DC adaptor comprising:

a DC power supply output connector to be coupled electrically to the electronic device;

an AC/DC converter to be coupled electrically to the AC power source for receiving the AC voltage signal therefrom and for performing AC/DC conversion upon the AC voltage signal to obtain a DC voltage signal;

a DC/DC converter that is coupled electrically to said AC/DC converter for receiving the DC voltage signal therefrom, that receives at least one control signal, and that adjusts a level of the DC voltage signal according to the at least one control signal so as to obtain an output DC voltage signal;

a device discriminator coupled electrically to said DC/DC converter for receiving the output DC voltage signal therefrom, and coupled electrically to said DC power supply output connector, said device discriminator being configured to provide the output DC voltage signal to said DC power supply output connector, and to generate, according to both (1) the output DC voltage signal and (2) the electrical power interconnection property of the electronic device coupled with said DC power supply output connector: a device indication signal set associated with a device specification of the electronic device; and a controller coupled electrically to said DC/DC converter for providing the at least one control signal thereto, said controller being coupled electrically to said device discriminator for receiving the device indication signal set, and storing a discrimination table and an initial value of the at least one control signal, said discrimination table recording a plurality of set values of the at least one control signal and a plurality of values of the device indication signal set, each of the set values of the at least one control signal corresponding to one of the values of the device indication signal set and further corresponding to an electronic device with a specified device specification, wherein prior to receipt of the device indication signal set by said controller, said controller outputs the at least one control signal according to the initial value such that said DC/DC converter adjusts the DC voltage signal according to the initial value of the at least one control signal, so as to obtain the output DC voltage signal that has a predetermined output voltage value and that is provided to said DC power supply output connector, and said device discriminator generates, according to the output DC voltage signal and the electrical power interconnection property of the electronic device coupled with said DC power supply output connector, the device indication signal set; and upon receipt of the device indication signal set by said controller, said controller identifies a target value in said discrimination table according to the device indication signal set so as to obtain the corresponding one of the set values of the at least one control signal as the target value, and outputs the at least one control signal according to the target value such that said DC/DC converter adjusts the DC voltage signal according to the target value, so as to obtain the output DC voltage signal which conforms with the device specification of the electronic device coupled to said DC power supply output connector, and which is outputted to said DC power supply output connector for transmission to the electronic device; and wherein the device indication signal set includes a first signal and a second signal, said DC power supply output connector having a first connector terminal and a second connector terminal to be coupled electrically and respectively to the first device terminal and the second device terminal of the electronic device, said device discriminator generating the device indication signal set based on an output current signal which flows from said first connector terminal, via the first device terminal and the second device terminal of the electronic device, to said second connector terminal and which corresponds to the predetermined output voltage value and the rated load of the electronic device, said device discriminator including: a resistor having a grounded first end, and a second end coupled electrically to said second connector terminal, a discrimination voltage signal being formed across said resistor according to magnitude of the output current signal and resistance of said resistor: a first comparator having a non-inverting input coupled electrically to said second connector terminal for receiving the discrimination voltage signal therefrom, an inverting input for receiving a first reference voltage, and an output for providing the first signal; and a second comparator having a non-inverting input coupled electrically to said second connector terminal for receiving the discrimination voltage signal therefrom, an inverting input for receiving a second reference voltage, and an output for providing the second signal; wherein the second reference voltage is greater than the first reference voltage.

2. The AC/DC adaptor as claimed in claim 1, wherein the at least one control signal provided by said controller includes a level adjusting signal, and said DC/DC converter includes: a high frequency inverter unit coupled electrically to said controller for receiving the level adjusting signal therefrom, and coupled electrically to said AC/DC converter for receiving the DC voltage signal therefrom, said high frequency inverter unit performing, according to the level adjusting signal, DC/AC conversion and level adjustment upon the DC voltage signal to obtain a converted voltage signal; a transformer unit coupled electrically to said high frequency inverter unit for receiving the converted voltage signal therefrom, and configured to vary a level of the converted voltage signal according to a turns ratio so as to obtain an induction voltage signal; and a rectifier unit coupled electrically to said transformer unit for receiving the induction voltage signal therefrom, and configured to perform rectification upon the induction voltage signal so as to obtain the output DC voltage signal; wherein prior to receipt of the device indication signal set by said controller, said controller sets the level adjusting signal according to the initial value for controlling said high frequency inverter unit to perform the DC/AC conversion and the level adjustment upon the DC voltage signal, so as to obtain the converted voltage signal that has a predetermined converted voltage value, said transformer unit varies the level of the converted voltage signal having the predetermined converted voltage value according to the turns ratio, so as to obtain the induction voltage signal that has a predetermined induction voltage value, and said rectifier unit performs the rectification upon the induction voltage signal having the predetermined induction voltage value, so as to obtain the output DC voltage signal having the predetermined output voltage value; and upon receipt of the device indication signal set by said controller, said controller sets the level adjusting signal according to the target value for controlling said high frequency inverter unit to perform the DC/AC conversion and the level adjustment upon the DC voltage signal, so as to obtain the converted voltage signal that has a target converted voltage value, said transformer unit varies the level of the converted voltage signal having the target converted voltage value according to the turns ratio, so as to obtain the induction voltage signal that has a target induction voltage value, and said rectifier unit performs the rectification upon the induction voltage signal having the target induction voltage value, so as to obtain the output DC voltage signal which conforms with the device specification of the electronic device coupled to said DC power supply output connector.

3. The AC/DC adaptor as claimed in claim 2, wherein said transformer unit includes a primary winding and a secondary winding, the turns ratio being a ratio of the number of turns in said primary and secondary windings of said transformer unit.

4. The AC/DC adaptor as claimed in claim 1, wherein the at least one control signal provided by said controller includes a level adjusting signal, a first enabling signal and a second enabling signal, and said DC/DC converter includes: a high frequency inverter unit coupled electrically to said controller for receiving the level adjusting signal therefrom, and coupled electrically to said AC/DC converter for receiving the DC voltage signal therefrom, said high frequency inverter unit performing, according to the level adjusting signal, DC/AC conversion and level adjustment upon the DC voltage signal to obtain a converted voltage signal; a transformer unit coupled electrically to said high frequency inverter unit for receiving the converted voltage signal therefrom, and configured to vary a level of the converted voltage signal according to a turns ratio so as to obtain an induction voltage signal; a first rectifier unit coupled electrically to said controller for receiving the first enabling signal therefrom, and coupled electrically to said transformer unit for receiving the induction voltage signal therefrom, said first rectifier unit being controlled by the first enabling signal to rectify the induction voltage signal for obtaining the output DC voltage signal; and a second rectifier unit coupled electrically to said controller for receiving the second enabling signal therefrom, and coupled electrically to said transformer unit for receiving the induction voltage signal therefrom, said second rectifier unit being controlled by the second enabling signal to rectify the induction voltage signal for obtaining the output DC voltage signal; wherein prior to receipt of the device indication signal set by said controller, said controller sets the level adjusting signal according to the initial value for controlling said high frequency inverter unit to perform the DC/AC conversion and the level adjustment upon the DC voltage signal, so as to obtain the converted voltage signal that has a predetermined converted voltage value, said transformer unit varies the level of the converted voltage signal having the predetermined converted voltage value according to the turns ratio, so as to obtain the induction voltage signal that has a predetermined induction voltage value, and said controller further sets starting values of the first and second enabling signals for enabling one of said first and second rectifier units and disabling the other of said first and second rectifier units, such that the enabled one of said first and second rectifier units rectifies the induction voltage signal having the predetermined induction voltage value, so as to obtain the output DC voltage signal having the predetermined output voltage value; and upon receipt of the device indication signal set by said controller, said controller sets the level adjusting signal according to the target value for controlling said high frequency inverter unit to perform the DC/AC conversion and the level adjustment upon the DC voltage signal, so as to obtain the converted voltage signal that has a target converted voltage value, said transformer unit varies the level of the converted voltage signal having the target converted voltage value according to the turns ratio, so as to obtain the induction voltage signal that has a target induction voltage value, and said controller further sets the first and second enabling signals according to the target value for enabling a corresponding one of said first and second rectifier units and disabling a non-corresponding one of said first and second rectifier units, such that the corresponding one of said first and second rectifier units rectifies the induction voltage signal having the target induction voltage value, so as to obtain the output DC voltage signal which conforms with the device specification of the electronic device coupled to said DC power supply output connector.

5. The AC/DC adaptor as claimed in claim 4, wherein said transformer unit includes a primary winding and a secondary winding, the turns ratio being a ratio of the number of turns in said primary and secondary windings of said transformer unit.

6. The AC/DC adaptor as claimed in claim 1, wherein the at least one control signal provided by said controller includes two level adjusting signals, and said DC/DC converter includes: two converter units each including a high frequency inverter unit coupled electrically to said controller for receiving a corresponding one of the level adjusting signals therefrom, and coupled electrically to said AC/DC converter for receiving the DC voltage signal therefrom, said high frequency inverter unit being controlled by the corresponding one of the level adjusting signals to perform DC/AC conversion and level adjustment upon the DC voltage signal to obtain a converted voltage signal, a transformer unit coupled electrically to said high frequency inverter unit, and a rectifier unit coupled electrically to said transformer unit; wherein prior to receipt of the device indication signal set by said controller, said controller sets the level adjusting signals according to the initial value for enabling one of said converter units and disabling the other of said converter units, said high frequency inverter unit of the enabled one of said converter units performs the DC/AC conversion and the level adjustment upon the DC voltage signal according to the initial value to obtain the converted voltage signal that has a predetermined converted voltage value, said transformer unit of the enabled one of said converter units varies the level of the converted voltage signal having the predetermined converted voltage value according to a turns ratio so as to obtain an induction voltage signal that has a predetermined induction voltage value, and said rectifier unit of the enabled one of said converter units rectifies the induction voltage signal having the predetermined induction voltage value so as to obtain the output DC voltage signal having the predetermined output voltage value; and upon receipt of the device indication signal set by said controller, said controller sets the level adjusting signals according to the target value for enabling a corresponding one of said converter units and disabling a non-corresponding one of said converter units, said high frequency inverter unit of the corresponding one of said converter units performs the DC/AC conversion and the level adjustment upon the DC voltage signal according to the target value to obtain the converted voltage signal that has a target converted voltage value, said transformer unit of the corresponding one of said converter units varies the level of the converted voltage signal having the target converted voltage value according to the turns ratio, so as to obtain the induction voltage signal that has a target induction voltage value, and said rectifier unit of the corresponding one of said converter units rectifies the induction voltage signal having the target induction voltage value, so as to obtain the output DC voltage signal which conforms with the device specification of the electronic device coupled to said DC power supply output connector.

7. The AC/DC adaptor as claimed in claim 6, wherein said transformer unit includes a primary winding and a secondary winding, the turns ratio being a ratio of the number of turns in said primary and secondary windings of said transformer unit.

8. A self-adaptive voltage output method to be implemented by an alternating current (AC)/direct current (DC) adaptor, the AC/DC adaptor being coupled electrically with an AC power source which provides an AC voltage signal, and with an electronic device which has an electrical power interconnection property, the AC/DC adaptor including a controller, an AC/DC converter coupled electrically to the AC power source for performing AC/DC conversion to obtain a DC voltage signal, a DC/DC converter coupled electrically to the AC/DC converter and configured to adjust, under control of the controller, the DC voltage signal so as to obtain the output DC voltage signal, a DC power supply output connector coupled electrically to the electronic device to provide the output DC voltage signal thereto, and a device discriminator outputting a device indication signal set to the controller, the device discriminator including a resistor, the electrical power interconnection property of the electronic device being a rated load, the self-adaptive voltage output method comprising:

(A) converting the AC voltage signal into an output DC voltage signal that has a predetermined output voltage value;

(B) outputting the output DC voltage signal that has the predetermined output voltage value to the electronic device via the DC power supply output connector, and generating, according to both: (1) the output DC voltage signal and (2) the electrical power interconnection property of the electronic device coupled with the DC power supply output connector, the device indication signal set associated with a device specification of the electronic device;

(C) obtaining a target value corresponding to the device indication signal set by identifying said target value in a discrimination table stored in the AC/DC adaptor, the discrimination table recording a plurality of set values corresponding respectively to electronic devices with specified device specifications and a plurality of values of the device indication signal set corresponding respectively to the electronic devices with the specified device specifications; and (D) adjusting the voltage value of the output DC voltage signal outputted to the electronic device according to the target value; and wherein the device indication signal set includes a first signal and a second signal, and in step (B), the device discriminator generates the first and second signals by comparing a discrimination voltage signal with a first reference voltage and a second reference voltage, respectively, the discrimination voltage signal being formed across the resistor according to magnitude of an output current signal and resistance of the resistor, the output current signal flowing from the DC power supply output connector, through the electronic device, back to the DC power supply output connector and through the resistor.

9. The self-adaptive voltage output method as claimed in claim 8, wherein, in step (D), the voltage value of the output DC voltage signal is adjusted back to the predetermined output voltage value when the electronic device is disconnected from the AC/DC adaptor.

* * * * *